Aug. 9, 1927. R. A. LEAHY Re. 16,701

METHOD OF AND APPARATUS FOR SCREENING GRANULAR MATERIALS

Original Filed March 28, 1921. 2 Sheets-Sheet 1

Inventor:
Richard A. Leahy,
by John N. Bruninga
His Attorney.

Aug. 9, 1927. R. A. LEAHY Re. 16,701

METHOD OF AND APPARATUS FOR SCREENING GRANULAR MATERIALS

Original Filed March 28, 1921 2 Sheets-Sheet 2

Inventor.
Richard A. Leahy,
by John W. Brunner
His Attorney.

Reissued Aug. 9, 1927. Re. 16,701

UNITED STATES PATENT OFFICE.

RICHARD A. LEAHY, OF BONNE TERRE, MISSOURI.

METHOD OF AND APPARATUS FOR SCREENING GRANULAR MATERIALS.

Original No. 1,456,067, dated May 22, 1923, Serial No. 456,431, filed March 28, 1921. Application for reissue filed December 18, 1923. Serial No. 681,441.

This invention relates to the art of screening granular materials.

One object of my invention is to provide a method of and an apparatus for screening granular materials that causes the particles of the material to be stratified according to their relative masses (or sizes, if the material is homogeneous) in such a way that the heaviest or coarsest particles of the material will be forced upwardly to the top of the layer of material and the lightest or finest particles will be brought in direct contact with the screening medium, thereby causing the lightest or finest particles of the material to pass through the meshes or openings in the screening medium without hindrance by the particles which are too large to pass through said openings or meshes.

Another object is to provide an apparatus for screening granular materials that materially increases the efficiency of the screening medium and overcomes the necessity of discontinuing the screening operation at frequent intervals and cleaning the screening medium, as is necessary with the methods heretofore in general use.

Other objects and desirable features of my invention will be hereinafter pointed out.

In accordance with this invention a stretched screening medium is vibrated by deflection thereof intermediate its ends; each upward movement of the medium is, however, suddenly arrested, so that each vibration is checked. This is accomplished by imparting a comparatively slow downward deflection to the medium, releasing the same in order to cause a quick upward movement of the medium and suddenly arresting the medium in its upward movement. The screening medium is acted upon by a spring, which is compressed during the downward deflection so as to store energy in the spring; upon release of the medium the stored or accumulated energy is applied to accelerate the medium upwardly until suddenly arrested.

Briefly described, my improved apparatus consists of a flexible screening medium that is held under tension, and means for subjecting said screening medium to such action that the particles of material thereon will be thrown upwardly with a force proportional to their masses (or sizes, if the material being screened is homogeneous), thereby causing the heaviest or coarsest particles of the material to be forced to the top of the layer of material on the screening medium and the lightest or finest particles to come in direct contact with the screening medium and pass through the openings or meshes in same. The screening medium is preferably inclined or arranged at an angle so as to cause the material to spread out in a layer and flow downwardly over same by gravity, and said screening medium is subjected to a differential vibrating motion at one or more points, so as to cause a slow downward movement and a quick or sudden upward movement of the screening medium, which latter is suddenly arrested or checked, thereby causing the heaviest particles of the material to be moved upwardly into a position where they will not obstruct the passage of the finer particles of the material through the screening medium. This treatment of the material being screened not only causes the particles to be stratified according to their relative masses or sizes and insures the lightest or finest particles passing freely through the screening material without hindrance by the particles which are too large to pass through the meshes of the screening medium, but it also prevents the openings or meshes of the screening medium from becoming permanently blinded or clogged by particles of material of approximately the same size as the meshes but which are just too large to pass through the meshes. Accordingly, my apparatus increases the efficiency of the screening medium and decreases the screening area necessary, by bringing the smallest particles in direct contact with the openings or meshes in the screening medium, and it overcomes the necessity of discontinuing the screening operation at frequent intervals and cleaning the screening medium so as to remove the particles that have become clogged in the openings or meshes of the screening medium.

Various forms of apparatus may be used to practice my method, but I prefer to use an apparatus that comprises a flexible screening medium stretched taut between two points and arranged in an inclined position, and means for imparting an arrested vibrating motion to one or more zones of said screening medium extending transversely across the entire width of same so as to obtain a comparatively slow movement downwards and an accelerated, quick, but arrested movement upwards beneath the layer of material resting on the screening medium.

Figures 1 and 2 of the drawings are diagrammatic views, illustrating the principle on which my apparatus operates.

Figure 1:
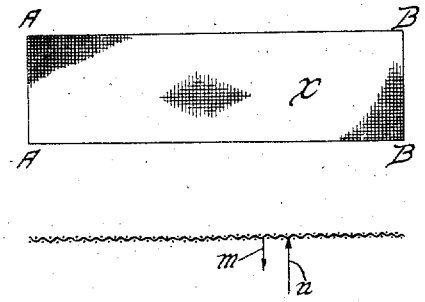
Figure 2:
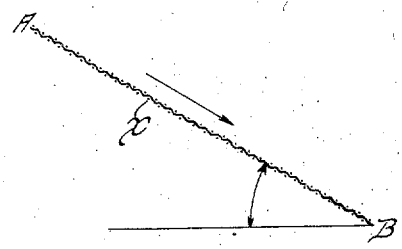
Figure 3:
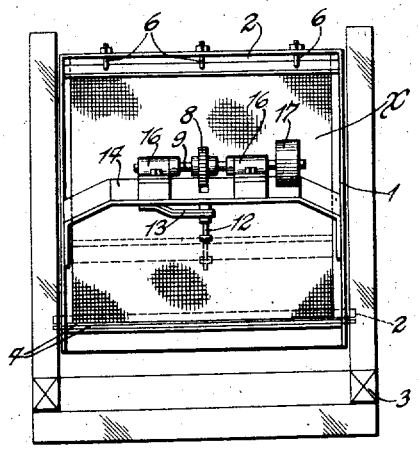
Figure 3 is a front end elevational view of the apparatus.

In Figures 1 and 2 X designates a flexible screening medium that is held in tension between the fixed lines of support A—A and B—B. An arrested vibrating motion is applied to the screening medium X at one or more points extending transversely across the entire width of said screening medium so that it obtains a comparatively slow movement downwards, represented by the arrow *m* in Figure 1, and an accelerated, quick but arrested movement upwards, indicated by the arrow *n*, beneath the layer of material resting on the screening medium X. The effect of this arrested motion on the particles of material on the screening medium is to throw them upwards with a force proportional to their masses (or sizes, if the material is homogeneous), the heaviest or coarsest particles of the material being forced to the top of the layer and the lightest or finest particles coming in contact with the screening medium and passing freely through the meshes or openings in same without being hindered by those particles of material which are too large to pass through said meshes. This arrested vibrating motion also prevents the openings of the screening material from becoming permanently blinded by particles that are just too large to pass through said meshes, as any particles likely to catch in the meshes are thrown upwardly by the accelerated motion, represented by the arrow *n* in Figure 1.

The screening medium X is preferably inclined downwardly from A to B, as shown in Figure 2, so as to cause the arrested vibrating motion to also impart a forward motion to the particles of material remaining on top of the screening medium, thus causing the particles which are too large to pass through the meshes to be carried downwardly by gravity and discharged at the lower end B of the screening medium.

When the material being screened is applied to the screening medium in a continuous [illegible] is the usual practice in ore and coal dressing plants, the finest particles of material immediately pass through the openings or meshes in the screening medium on coming in contact with the upper end portion of the screening medium X, thus leaving the larger part of the screening area for the separation of those particles more nearly the same size as the opening or meshes through which they should pass. The stratification is completed on the lower end portion of the screening medium which is subjected to the arrested vibrating motion, said vibrating motion also preventing the openings of the screening medium from becoming permanently blinded or clogged with particles of the material.

In practice I prefer to apply the arrested vibrating motion to only the lower end portion of the screening medium X, but in view of the fact that the screening medium is flexible and under tension, and is connected only at its opposite ends to the supporting structure which carries it, the entire screening medium will vibrate between the two points A and B, the minimum vibration being applied to the upper end portion of the screening medium through which the finest particles of the material pass, and the maximum vibration being applied to the lower end portion of the screening medium over which the coarsest particles of the material travel. This zone of maximum vibration extends uniformly across the entire screening area, transversely of the direction of the material over the screening medium. Accordingly, all the particles passing through the zone of minimum vibration which are too large to escape through the meshes in the portion of the screening medium constituting this zone must pass through the zone of maximum vibration before reaching the point B of final discharge for the over-sized particles.

Figure 4:
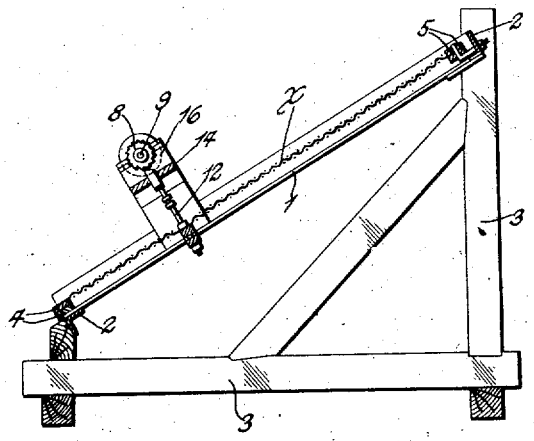
Figure 4 is a longitudinal sectional view of said apparatus.
Figure 5:
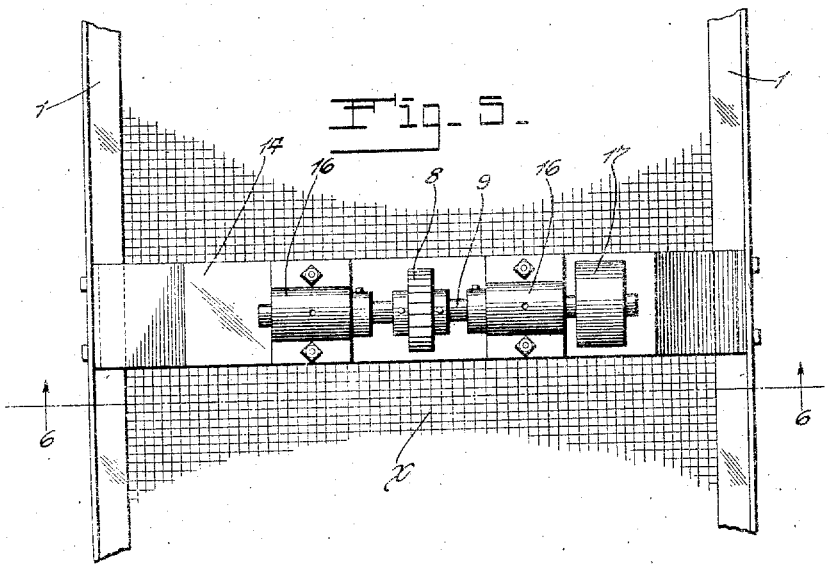
Figure 5 is an enlarged top plan view of a portion of said apparatus.
Figure 6:
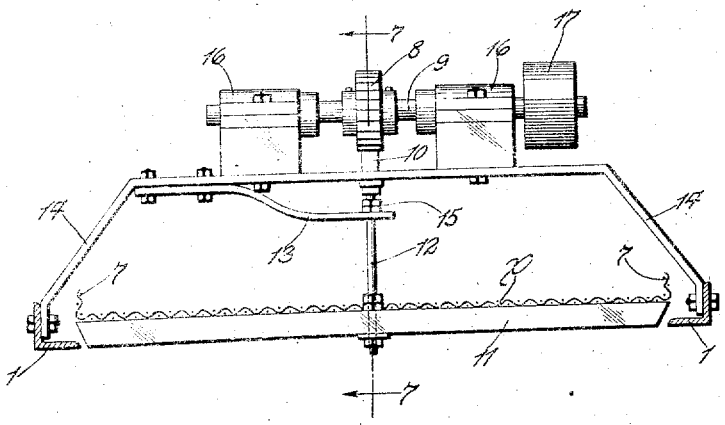
Figure 6 is a transverse sectional view, taken on the line 6—6 of Figure 5.
Figure 7:
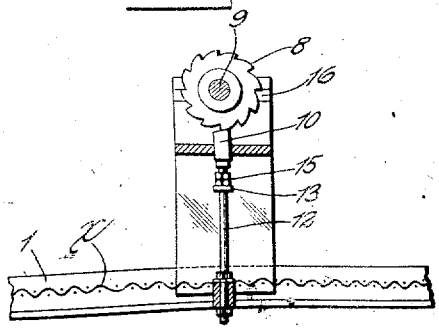
Figure 7 is a longitudinal sectional view, taken on the line 7—7 of Figure 6.

The apparatus can be constructed in various ways, but I prefer to equip it with a flexible screening medium X consisting of a strip of wire cloth or punched sheet metal suspended within a rectangularly-shaped frame composed of side pieces 1 and end pieces 2 arranged in an inclined position on a supporting structure 3, as shown in Figure 4. The lower end of the screening medium X is preferably clamped between two transversely-disposed bars 4 that are permanently connected in any preferred manner to the frame within which the screening medium is arranged, and the upper end of the perforated strip X that constitutes the screening medium of the apparatus is clamped between two transversely-disposed bars 5 that are connected by means of tension bolts 6 to the upper cross piece 2 of the rectangularly-shaped frame in which the screening medium is arranged. The tension bolts 6 not only serve to hold the screening medium under sufficient longitudinal tension to make said medium resilient, but they form an easily adjustable means for varying the tension of the screening medium. The screening medium X is preferably provided at its longitudinal side edges with upwardly-projecting flexible flanges 7, as shown in Figure 6, so as to prevent the unscreened material from escaping from the side edges of the screening medium, but said side edges are not connected to the side pieces 1 of the frame in which the screening medium is stretched.

Various means can be used for imparting the differential vibrating motion to the screening medium X of the apparatus, but I prefer to use a means consisting of a multiple toothed cam 8 connected to an operating shaft 9 and arranged to cooperate with a tappet 10 that is connected by means of a rod 12 to a wooden cross beam 11 that extends transversely underneath the screening medium X across the entire width of same. The upper end of said rod is threaded into the tappet 10 and the lower end portion of said rod is secured to the cross beam by nuts or in any other suitable way, the cross beam being fastened to the screening medium X by wooden screws or in any way that will cause the screening medium to vibrate when the cross beam 11 moves upwardly and downwardly. The tappet 10 is held against the face of the cam 8 by a leaf spring 13 rigidly connected at one end to a transversely-disposed supporting member 14 arranged above the screening medium, said spring having its opposite end adjustably connected to the tappet rod 12 by means of nuts 15, which can be adjusted so as to vary the tension of the spring 13. At each cycle of operations of the shaft 9, the cross beam or member 11 will move downwardly slowly, followed by an accelerated upward movement that is suddenly arrested by the tappet 10 striking against the cam 8 which virtually acts as an anvil, thereby causing the particles of material on the screening medium to be thrown upwardly with a force proportional to the masses of said particles. The operating shaft 9 is journaled in bearings 16 on the transversely-disposed supporting member and is provided with a pulley 17 that is adapted to co-operate with a driving belt (not shown), the supporting member 14 being rigidly connected to the side pieces 1 of the frame in which the screening medium is stretched. When the apparatus is equipped with a twelve-toothed cam, the cam shaft 9 is preferably operated at about 200 R. P. M., so as to impart about 2400 vibrations per minute to the screening medium. If the cam 8 is equipped with teeth about $\frac{3}{32}$ of an inch high, the maximum vibration of the screening medium X will be about $\frac{1}{16}$ of an inch vertically. The power consumption of such an apparatus is exceedingly slight, as I have found that less than ¼ H. P. is sufficient to drive a 3 ft. screen at 2400 vibrations per minute with a full load.

In the various kinds of screening devices heretofore used for screening granular material the openings or meshes of the screening medium become blind after a short period of operation. This blinding decreases the screening efficiency sometimes more than 50%. When this occurs it is necessary to stop the screening operation and clear the openings or meshes of the screening medium by hammering the screening medium or striking it a blow with a stick or other device. Sometimes water sprays are used in wet screening in an endeavor to prevent the screening medium from becoming blinded or clogged, but it has been found that water sprays will not keep the screening medium clean and the meshes of same unobstructed. My improved apparatus overcomes the above-mentioned characteristics of the screening device heretofore in use, as the arrested vibrating motion which is applied to the screening medium prevents the particles of material from becoming clogged in the meshes of the screening medium. In fact, I have found in dry screening material of a damp or sticky nature, such, for example, as mine run ore containing three or four per cent moisture, the openings or meshes of the screening medium are kept free by the arrested vibrating motion which throws the lumps of damp material to the top of the layer on the screening medium, thus permitting the free particles to pass through the openings or meshes of the screening medium.

My invention not only increases the efficiency of the screening medium of an apparatus used for screening granular material, and reduces the time required to screen such material, due to overcoming the necessity of discontinuing the screening operation at frequent intervals and cleaning the screening medium of the apparatus, but it also increases the speed of the material passing over the screening medium, thereby making it possible to diminish the slope or angle of the screening medium of the apparatus and thus reduce the head room required in the mill for the apparatus.

In accordance with this invention, therefore, the vibration is not a sustained or free one, but rather a checked and forced one. At the end of each downward deflection the screening medium is released so as to move quickly upwardly, due to its own tension and the tension of the accumulator spring 13. If now the mechanism were then left to vibrate freely until damped due to its own resistance, the particles on and especially those in the screen meshes, would tend to vibrate with the medium without becoming fully dislodged. Where, however, the quick upward movement is suddenly arrested, the vibration is not only merely damped but checked and wholly arrested; accordingly this sudden stoppage will cause the particles to be thrown violently upwardly and not only become dislodged, but to become in fact stratified in accordance with their masses, so that the finer particles will remain nearer the medium so that the screening efficiency will be a maximum. The deflection of the screening medium, its release and its checking is at regular intervals, corresponding to the number of teeth on and the speed of rotation of the cam 8; accordingly the vibration is a forced one as distinguished from a free or unrestrained vibration. This enables the screen to be adapted for various materials by control of the number of vibrations, the screen tension and the strength of the spring 13, and the amplitude of the vibration. The deflection is applied to a stretched screening medium and intermediate its ends and the arrest is of the medium itself, as distinguished from a vibration applied to a frame in which the medium is stretched or mounted. The latter arrangement would still leave the medium itself free to vibrate after the frame was arrested, while in accordance with this invention the screen itself is deflected, released and arrested, thereby not only avoiding the rapid movement of a heavy frame, but also causing the medium itself by its own inherent flexibility to properly act on each particle. It has been found that superior results are produced if the deflection is along a line nearer the lower end of the screen, especially since the vibration is a forced and interrupted one; this moreover provides a longer surface to the zone of maximum vibration.

It is obvious that various changes may be made in details without departing from the spirit of this invention; it is, therefore, to be understood that this invention is not to be limited to the specific details shown and described.

Having thus described my invention, what I claim as new and desire to secure by Letters Patent of the United States is:

1. An apparatus for screening granular material, comprising a flexible screening medium arranged in an inclined position and held under longitudinal tension, the side edges of said medium being free to vibrate, and means connected directly to said screening medium at a point intermediate its ends and extending transversely across the entire width of same for vibrating said medium upwardly and downwardly so as to impart a comparatively slow downward movement to said screening medium followed by an accelerated upward movement that is suddenly arrested, thereby causing the particles of material on said screening medium to be thrown upwardly with a force proportional to the masses of said particles.

2. An apparatus for screening granular material, comprising a flexible screening medium arranged in an inclined position and held under longitudinal tension, the side edges of said screening medium being free to vibrate, a rigid member arranged transversely across said screening medium adjacent the lower end of same and connected directly to said screening medium, and means for vibrating said member downwardly and upwardly comprising a part connected to said member and a cooperating anvil against which said part strikes so as to suddenly arrest the upward movement of said screening medium, thereby causing the particles of material on said screening medium to be thrown upwardly with a force proportional to the masses of said particles.

3. An apparatus for screening granular material, comprising a stationary frame arranged in an inclined position, a piece of mesh material held in said frame under sufficient longitudinal tension to produce a flexible screening medium having inherent resiliency, the side edges of said screening medium being free to vibrate, an operating shaft arranged transversely of said frame, a transversely-disposed, rigid member connected directly to said screening medium and extending across the entire width of same, and means actuated by said operating shaft for imparting a differential vibrating motion to said transversely-disposed, rigid member comprising a part connected to said member, and a co-operating anvil against which said part strikes so as to suddenly arrest the upward movement of said screening medium, thereby causing the particles of material on said screening medium to be thrown upwardly with a force proportional to the masses of said particles.

4. An apparatus for screening granular material, comprising a frame arranged in an inclined position, a strip of flexible screening medium arranged between the side pieces of said frame in such a way that the side edges of said medium are free to vibrate relatively to said side pieces, means for connecting the ends of said screening medium to the top and bottom cross pieces of the frame and holding said medium under sufficient longitudinal tension to make said medium resilient, a transversely-disposed, rigid member connected directly to said screening medium and extending across the entire width of same, an operating shaft supported at a point above said screening medium, and a tappet mechanism operated by said shaft for vibrating said member upwardly and downwardly, comprising a cam on the shaft and a cooperating part on said member that strikes against said cam with sufficient force during the upward movement of said member to suddenly arrest the upward movement of the screening medium for the purpose described.

5. The method of screening granular materials comprising, vibrating a stretched screening medium by downward deflection thereof intermediate its ends, releasing the same, suddenly arresting each upward movement of the medium and before it reaches the end of its otherwise normal upward vibrating movement, and passing the material over the vibrating medium, whereby the particles will be thrown upwardly with forces proportional to their masses.

6. The method of screening granular materials comprising, vibrating a screening medium, stretched in an inclined position, by deflection downward thereof intermediate its ends while the material is fed thereon, releasing the same, and suddenly arresting each upward movement of the medium and before it reaches the end of its otherwise normal upward vibrating movement, whereby the particles will be thrown upwardly and passed along the medium.

7. The method of screening granular materials comprising, vibrating a stretched screening medium by downward deflection thereof at definite time intervals intermediate its ends, releasing the same, suddenly arresting the upward movement of the medium at the end of each interval and before it reaches the end of its otherwise normal upward vibrating movement, and passing the material over the vibrating medium.

8. The method of screening granular materials, comprising, imparting at regular intervals a downward movement to a stretched screening medium intermediate its ends, releasing the medium at the end of each downward movement so as to cause it to move upwardly, suddenly arresting the upward movement of the medium and before it reaches the end of its otherwise normal upward vibrating movement, and passing the material over the vibrating medium.

9. The method of screening granular materials comprising, imparting at regular intervals a comparatively slow downward movement to a stretched screening medium intermediate its ends, releasing the medium at the end of each downward movement so as to cause it to move quickly upwardly, suddenly arresting the upward movement of the medium and before it reaches the end of its otherwise normal upward vibrating movement, and passing the material over the vibrating medium.

10. The method of screening granular materials comprising, deflecting a stretched screening medium downward intermediate its ends while energy is stored in an accumulator, releasing the medium and applying the stored energy thereto, suddenly arresting the upward movement of the medium and before it reaches the end of its otherwise normal upward vibrating movement, and passing the material over the medium.

11. The method of screening granular materials comprising, imparting at regular intervals, to a screening medium stretched in an inclined position a downward movement nearer its lower end, releasing the medium at the end of each downward movement, suddenly arresting each upward movement of the medium and before it reaches the end of its otherwise normal upward vibrating movement, and passing the material over the medium and through the zone of maximum vibration.

12. An apparatus for screening granular materials comprising, a pair of end supports, a screening medium stretched between said supports, means for vibrating said medium by downward deflection and release thereof, and means for suddenly arresting each upward movement of the medium and before it reaches the end of its otherwise normal upward vibrating movement adapted to stop the vibration and throw the material particles upwardly.

13. An apparatus for screening granular materials comprising, a pair of end supports, a screening medium stretched in an inclined position between said supports, means for vibrating said medium by downward deflection and release thereof, and means for suddenly arresting each upward movement of the medium and before it reaches the end of its otherwise normal upward vibrating movement adapted to stop the vibration and throw the material particles upwardly and along the medium.

14. An apparatus for screening granular materials comprising, a pair of end supports, a screening medium stretched between said supports, means for vibrating said medium by downward deflection and release thereof at regular time intervals, and means for suddenly arresting the upward movement of said medium at the end of each interval and before it reaches the end of its otherwise normal upward vibrating movement.

15. An apparatus for screening granular materials comprising, a pair of end supports, a screening medium stretched between said supports, means for deflecting said medium downwardly at regular intervals and for releasing the same at the end of each deflection, and means for suddenly arresting the upward movement of said medium at the end of each interval and before it reaches the end of its otherwise normal upward vibrating movement.

16. An apparatus for screening granular materials comprising, a pair of end supports, a screening medium stretched between said supports, means for imparting a comparatively slow downward deflection to said medium and for releasing the same to permit quick upward movement thereof, and means for suddenly arresting the upward movement of said medium and before it reaches the end of its otherwise normal upward vibrating movement.

17. An apparatus for screening granular materials comprising, a pair of end supports, a screening medium stretched between said supports, a spring acting on said medium, means for deflecting said medium downwardly intermediate its ends and for tensioning said spring, and means for releasing said medium adapted to suddenly arrest the upward movement thereof and before it reaches the end of its otherwise normal upward vibrating movement.

18. An apparatus for screening granular materials comprising, a pair of end supports, a screening medium stretched in an inclined position between said supports, means acting on said medium nearer its lower end adapted to deflect the same downwardly, and means for releasing said mechanism adapted to suddenly arrest the upward movement thereof and before it reaches the end of its otherwise normal upward vibrating movement.

Signed at St. Louis, Missouri, this 3rd day of December, 1923.

RICHARD A. LEAH[illegible]